United States Patent [19]
Bruck et al.

[11] Patent Number: 5,561,271
[45] Date of Patent: Oct. 1, 1996

[54] LOW-VOLTAGE POWER CABLE

[75] Inventors: Jochen Bruck, Castrop-Rauxel; Achim Bredin, Bochum, both of Germany

[73] Assignee: Bruck GmbH & Co. KG, Herne, Germany

[21] Appl. No.: 408,853

[22] Filed: Mar. 22, 1995

[30] Foreign Application Priority Data

Mar. 23, 1994 [DE] Germany .................. 9404913 U
Mar. 23, 1994 [DE] Germany .................. 9404914 U

[51] Int. Cl.6 .................. H01B 7/00; H01B 7/08
[52] U.S. Cl. .................. 174/117 R; 174/117 F; 439/492; 439/499
[58] Field of Search .................. 174/117 R, 117 F, 174/117 FF; 439/492, 499, 502

[56] References Cited

U.S. PATENT DOCUMENTS

| | | | |
|---|---|---|---|
| 1,984,355 | 12/1934 | Abbott | 174/48 |
| 4,486,253 | 12/1984 | Gonia | 156/51 |
| 4,988,890 | 1/1991 | Narhi et al. | 307/147 |
| 4,993,795 | 2/1991 | Okura | 174/117 R |
| 5,252,091 | 10/1993 | Fujita et al. | 439/499 |

*Primary Examiner*—Kristine L. Kincaid
*Assistant Examiner*—Chau N. Nguyen
*Attorney, Agent, or Firm*—Kinney & Lange, P.A.

[57] ABSTRACT

With a low-voltage power cable (1), which has an insulator (2) and, on both broad sides of the insulator (2), wire-cloth bands (3 through 6) serving as current phases, which are attached to the broad sides of a rectangular cross-section (11, 12) of the insulator (2), it is planned according to the invention that the insulator (2) forms a rail which is multiply flanged and slender in its main axis, and the wire-cloth bands (3 through 6) are arranged in profile chambers (7 through 10) which are formed by the rectangular cross section (11, 12) and the profile flanges (14 through 16).

22 Claims, 3 Drawing Sheets

LOW-VOLTAGE POWER CABLE

BACKGROUND OF THE INVENTION

The invention deals with a low-voltage power cable [according to the preamble of claim 1].

Low-voltage power cables according to the invention form, in particular, the current-conducting building group of a system, that, depending on the number and kind of its accessories, consists of several power users and if necessary, of a transformer, that transforms the line voltage into the low voltage range. Preferably it deals, in the case of the low-voltage power cable according to the invention, with the supplying of current to a lighting arrangement, whose light fixtures are fitted with halogen lamps. Such systems are mounted on large surfaces, for example, over ceilings, in order to illuminate the room itself or certain objects in the room.

With these and other systems the low-voltage power cable according to the patent, along with its holders which hold it on the mounting surface, takes over the function, beyond that of guiding the current, of removing the stresses, especially those due to the weight, coming from the directly mounted structural groups. The mentioned lighting system deals therefore essentially with the mounting of light units. Due to its rectangular cross-section, the low-voltage power cable develops its greatest load-bearing capability in the direction of the long axis of the rectangular cross-section, corresponding therefore in space to the y-axis. With respect to a ceiling-mounted system, the longer sides of the conductor cross-section run perpendicular.

The wire cloth bands, which constitute the current phases of such a system, are electrically isolated by means of insulators. However, through their mounting on the insulator they form a material bond with the insulator, through which the insulator, made of a dielectric material, gains increased load-carrying strength from the wire cloth. The wire cloth bands are relatively thin, but they offer, nevertheless, a relatively low electrical resistance. For this purpose they can be bonded over their whole surface to the insulator, for example they can be glued.

Such low-voltage power cable for lighting arrangements, as such, are known (DE-GM 89 12 824). The power cable forms a band that is flexible in all directions. Here the insulator has a certain outline on its rectangular surface, on whose longer sides the wire cloth bands are fastened, which bands therefore lie with their edges free and projecting out from the outline of the insulator. The current-carrying band is flexible, and must therefore be fixed at both ends, as well as being held in an upright position at one end by a insulating anchoring means. The twisting rigidity of this band is nevertheless comparably weak. That necessitates high tension for anchoring the cable. In spite of that, the suspended band lengths are small. Heavy accessories, for example light units arranged in narrow spaces, require a multiplicity of band holders. Furthermore the straight run-lengths are in general predetermined. When the system, due to conditions at the site, requires sections of band which bend toward each other in the plane of the system, the band must be lead through anchored curved pieces at the vertices of the bends and corners. That greatly reduces the possibilities of configuring such a system.

The known low-voltage power cable, because it shows only two current phases, is not suitable for extensive lighting systems, for with such systems possibly such a large number of accessories are required that the suspended wire cloth bands are not safe to touch.

SUMMARY OF THE INVENTION

The invention by contrast takes a different approach[, the fundamental concept of which is reported in claim 1. Further characteristics are the objective of dependent claims].

According to the invention a rail is created by molding and by its shaping, chosen to accord to the invention, the rail being flexible in the horizontal spatial plane i.e., the x-direction, nevertheless in the perpendicular spatial plane, i.e., in the y-direction, it is stiff. It can be installed tension-free between its mounts, and secure from tilting. The former requirement for anchoring and for insulating anchors is obviated. Beyond that, since the profile is executed so as to be slender in its y-axis, it allows itself to be bent in the x-direction into relatively sharp radii, without kinking and tipping. In this way arced band sections are possible, in which the bending effects an increased resistance to bending, so that such arced sections require no anchors.

According to the invention, furthermore, the profiling of the track is so chosen, that the wire cloth bands no longer project out sideways from the cross-section of the insulator, but, on the contrary, they are sunk into profiled side surfaces. In this way, the edges of the metal bands and their bondings with the insulator are covered. For this reason the wire cloth bands give static support, so that even with higher weight-loading of the low-voltage power rails according to the invention the kinking stresses are practically removed in a distortion-free manner.

The invention has the advantage that the profile of the insulator can be produced from a single piece of plastic, according to common molding processes, for example, through extrusion. In the event of distortion, if need be the wire cloth bands can be made to enclose the extrusion after it has cooled. With the application of the new low-voltage power cables in systems, new possibilities for installation are suggested, especially in lighting systems which have few light units, particularly those that can get along without the relatively expensive holders and anchoring insulators. The increased load-bearing capability, provided by the shaping of the insulator, permits an extensive number of light units and a suitable division of the power-using accessories over the suspended sections of the power rail.

[In the form used in practice according to claim 2,] According to the invention, the profile of the insulator is formed symmetrically. The symmetry of the profile moves the center of gravity of the profile to the band center and has accordingly the advantage that the security from tipping is increased.

Preferably the profile outline will receive the form [reported in claim 3] double-T profiles which are joined at the profile flanges thereof in a constructed unity. In this case each wire cloth band can be assigned its own profile chamber and the number of wire cloth bands can be increased by a count divisible by two. Such a low-voltage power cable has the advantage that it is applicable to several individually switchable systems, whose current phases must be reliably isolated from one another.

In the implemented form [characterized in claim 4] of the invention, a practical form of the preferred slenderness of the insulator profile is described. In this case and in general, the number of phases can be anything one wishes. In practice, however, one needs in any given case only a limited number of phases, where as a rule two systems suffice, so that four wire cloth bands and two double-T-profile insulators result for the whole profile. For these cases the preferred dimensions [described in claims 4 and 5] are provided and result in a double-stiff and kink- or tipping-secure band.

The double-T profile cross-sections have the further considerable advantage that they form profile chambers on both sides, which chambers can be utilized for the installation of the wire cloth bands. [These implemented forms are the objective of claim 6.]

The dividing up of the phases on the profile of the insulators in the implemented forms of the invention, which are provided for several systems and which therewith are provided with more than two wire cloth bands, can result from [the characteristics of claim 7.] the wire-cloth bands being arranged on one side of the insulator and assigned to one or several systems and the wire-cloth bands arranged on the opposite side being assigned to one of several additional systems. In this case, the systems are arranged on one side of the power cable. The input feed for the current thereto can be accomplished in especially simple cases from either side.

The accommodation of the wire cloth bands preferably is accomplished for security reasons through the [features of claim 8.] sinking of the wire-cloth bands in the profile chambers in such a manner that the outer sides thereof are essentially flush with the outer edges of walls of the profile chambers. Since in this case the bands along with their cross-section are completely embedded in the profile chambers, the result is that, due to the insulating profile flanges, practically no danger of a short circuit exists.

The profile of the insulator-rail can be reduced to a form [that is described in claim 9] wherein the mirror-symmetrical insulator has two double-T profiles, whose middle bridge electrically isolates the wire-cloth bands of two systems and whose middle flange electrically isolates the wire cloth bands of both systems. Such implementation forms of the invention can by reason of their simple design also be produced more easily in complicated forms. In particular the insulator-rail can be produced in accordance with proven design techniques for molding of plastics. [This is the objective of claim 10.] In such an arrangement the rail forming the profiled insulator has a full cross-section of extruded material. Here the plastic is extruded and the insulator forms an essentially endless band, that can be provided on a production line along with the wire cloth bands. As starting point, the choice of plastic results from consideration of dielectric properties, but it can at the same time turn to external appearances [and in this way demonstrate the features in claims 10 and/or 12].

The installation of the low-voltage power cable, according to the invention, requires accessories which on the one hand allow a secure attachment of light units and on the other hand allow mounting means, which attach the low-voltage power cable to the building surface, preferably to a ceiling or a wall, whereby, in addition, a current supply from a suitable current source requires accessories. For this case the invention [according to claims 13 to 21] provides for one or more adapters as accessories. The fundamental form of the adapter, [described in claim 13,] is that it is of several parts and it connects the adapter by means of a frictional clamping with the low-voltage power cable, so that any position at all on the power cable can be provided for. In this way light units, which are connected through the adapter to the power cable, can also be mounted at changeable locations on the power cable. This also applies for the mounting holders, which are placed as needed and are also changeable in their placement.

If the adapter finds application as a cable connection, it is be fitted out preferably [according to features of claim 14] using contact springs for electrical connection of the wire-cloth bands. In this case the wire cloth bands and the contact springs, serving as current output or current supply means, are located in the insulator housing and are therefore safe from being touched. This can be additionally improved by means of [the features of claim 15] an axial slit on the housing for the reception of the insulator rail, for by these means according to the invention a simplified push connection of the adapter with the low-voltage power cable can be achieved.

The individual parts of the adapter required for this are producible in a simple manner [if the features of claim 19, and if need be claim 17, are effected] described herein. For then the housing consists of a rotationally-symmetric design, and the parts can be simply injection molded or turned.

[The features of claim 18 contribute to further simplification.]

BRIEF DESCRIPTION OF THE DRAWINGS

The details, further features and other advantages of the invention reveal themselves in the following description of an implementation, with the help of the figures in the drawings: they show FIG. 1 The cross-section of the low-voltage power cable, FIG.2 A cutaway representative sideview of the object of FIG. 1, FIG. 3 A lighting system that utilizes the low-voltage power cable for meeting the electrical current needs of a user, that nevertheless can be occupied by several users, shown in a perspective representation and FIG. 4 An adapter for the low-voltage power cable according to FIG. 1 to 3, shown in longitudinal section.

DETAILED DESCRIPTION OF THE PREFERRED EMBODIMENTS

Figure 1:
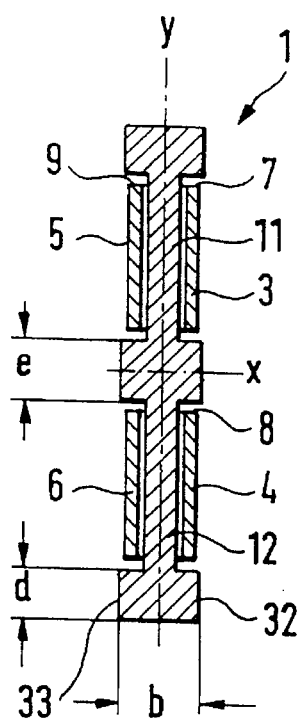

The power cable indicated in a general way by 1 in FIG. 1 shows an insulator 2 as well as wire cloth bands 3, 4 and 5, 6 on the two broad sides of an insulator. These at the same time conduct a current phase in the lighting system shown in FIG. 3. They are attached to the broad sides of the rectangular cross-section of the insulator 2.

The insulator shows a multiply-flanged profile, and in its y-axis, which represents the principal axis of the profile, a slender profile. The metal bands are placed in profile chambers 7 to 10. These are bounded by rectangular cross-section 11, 12 and profile flanges 14 to 16, and are open outward. The profile of FIG. 1 is formed with mirror symmetry along the principal axes x and y. Its profile outline is formed of two double-T profiles 17, 18 placed against each other, and these are fused. The two profiles are united at their oppositely oriented flanges into flange 15 and form in this way a unit construction. The ratio of the greatest profile width b to the profile height h is about 5:30. The thickness d of the essentially right-angled flanges 14 to 16 of the two double-T-profiles 17 and 18, in contrast to the thickness e of the profile strap 19, amounts to approximately a 3:4 ratio.

Figure 2:
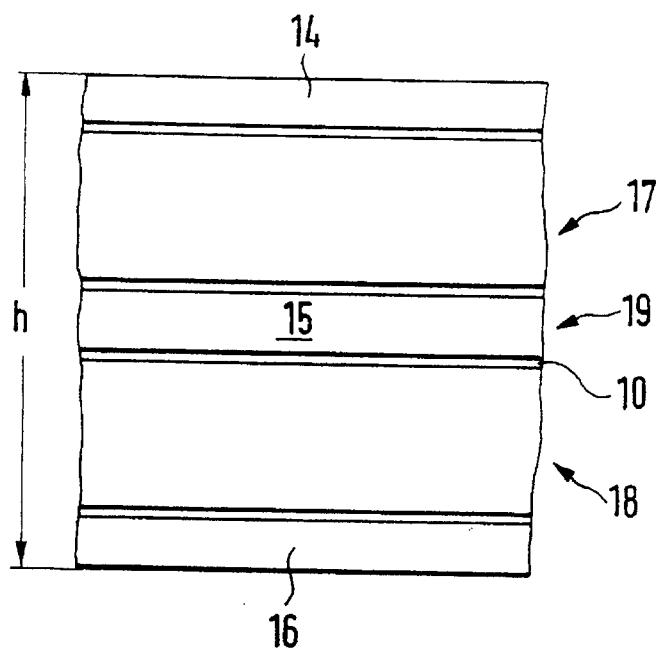

The wire cloth bands are glued with their sides related to the cross-sections 11 and 12, each to that wall related to it in profile chamber 7 to 10. Their long edges, which appear in the side view according to FIG. 2 for metal bands 5, and for metal band 6, do not fit tightly on the underside of the profile flange, and are therefore easily glued into the profile chambers. By this means, their full surface bonding with the insulator 2 leads to an improvement in kinking and bending resistance in the y-direction of the profile, while in the x-direction the profile remains generally elastic, i.e., with bending it can be moved back and in this way, in a given system between two holders 24 and 25, which hold the low-voltage current track 1 a distance from a ceiling 26, can form a uniformly-bent bow 27.

Figure 3:
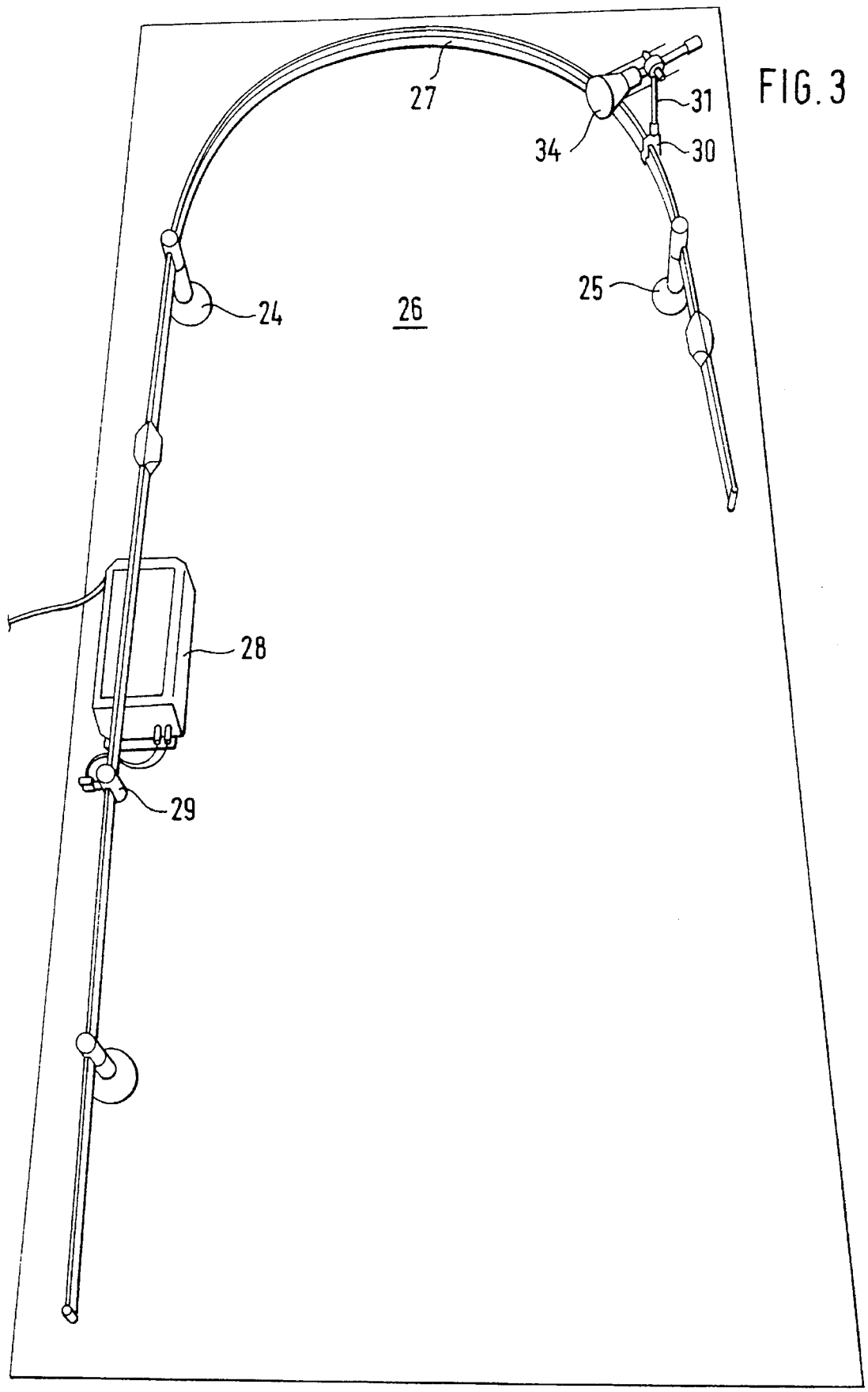

The lighting system described in FIG. 3 is, to be sure, only for a single system, i.e., the transformer 28 is, with the help of the double clamp 29, attached to the outer metal bands 5, 6 or 4, 3. The inner wire cloth bands in the system according to FIG. 3 are not utilized, but would require a second transformer if they were used for a second system, which transformer is connected with a corresponding clamp that is electrically connected with the inner wire cloth bands. The current-conducting wire cloth bands 5, 6 of the system lead the current to an adapter 30, which feeds a light unit 34 through a suspension device 31. Since the adapters are supported from above by the outer flanges 14 or 16, the electrically-conductive connection of the adapter with the current conducting wire cloth bands 5, 6 is possible through a simple spring contact, which bridges over the distance between the adapter and the wire cloth bands which essentially align with the outer edges 32, 33 of the profile chamber walls.

With the represented implementation form, by which the mirror-symmetrical insulator 2 shows two double-T-profiles 17 and 18, the middle step, arising from the rectangular cross-sections 11, 12, separates wire cloth bands 3, 4 or 5, 6 of the two system and the middle flange 15 electrically separates metal bands 3, 4 or 5, 6 of both systems. These are therefore secure from arc-over.

Figure 4:
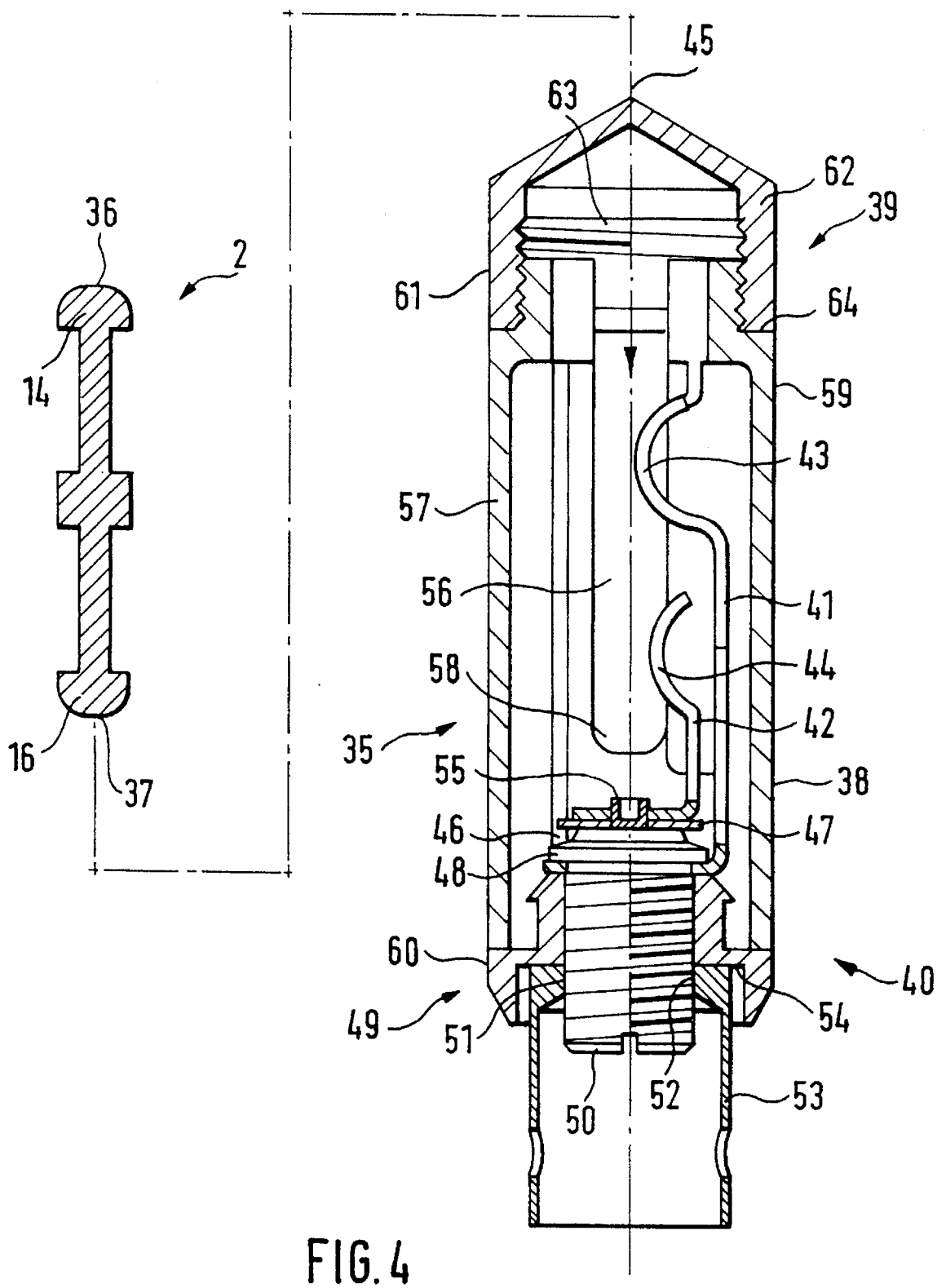

According to the representation of FIG. 4, the implementation of the track of the insulator 2, represented without the wire cloth bands next to the adapter 35, shows at its outer flanges 14 and 16, in contrast to the implementation according to FIG. 1, convex-curved back surfaces 36, 37. The adapter 35 has an insulator that is configured as a housing 38 enclosing the insulator track 2. The housing is equipped at its upper end as seen in FIG. 4 with a clamp 39, which is provided for removable attachment to the insulator-rail 2. At the opposite end is provided a connector 40 for electrical connection of the housing to a current branching holder, not represented, but as an example is configured as a coaxial cable, which serves for feeding current to the wire cloth bands, not represented, of the insulator-rail 2 or for tapping off current for forwarding to a likewise not represented low voltage light unit.

In the example of implementation, socketed spring contacts 41, 42 are provided for electrical connection to the wire cloth bands. The socketed spring contacts show curved contacts 43, 44 and are parallel to the housing axis 45, and as well have their contacts arranged above each other. The lower contact spring ends rest in a base 46 whereby the lower contact spring 42 is electrically isolated from the metal base by means of an insulator sheath 47. The base 46 shows a flange 48 with which the lower end of the upper contact spring 41 is tightened with the screw cap 49. The base 46 forms a constructed unit with a socket bushing 50 and is provided with an outer thread 51. On the outer thread rides the inner thread 52 of a flange of a screw collar 53, with which the receptacle bushing 50 is tightened, when the flange of the screw collar 53 seats itself on the inner ring surface 54 of the screw cover 49. The additional connecting parts for a coaxial cable are not included in FIG. 4 because they are as such well known. They consist essentially of a bushing 55 for accepting the inner leads of the coaxial cable and of a threading of the ring of the outer conductor with a receptacle bushing 50.

The housing shows an axial slit 56 for accepting the insulator track, which slit passes through the housing cylinder 57. The inner end 58 of the slit 56 is curved to fit the convex surface 37 of the insulator track, in order to produce with it a form-fitting contact. The convex surface 37 of the insulator track supports itself on the curved surface 58, when the clamp 39 is closed. Since the housing 38 consists of a hollow cylinder 57, it surrounds the current-carrying contact springs and the wire cloth bands. The clamp 39 and the connector 49 are formed with rotational symmetry around the cylinder axis 45. In this way the outer cylinder surface 59 of the housing 38 aligns with an outer cylinder surface 60 of the screw cap at the connector 49 and with an outer cylinder surface 61 of the clamp 39, which is formed from a screw cap 62. In this way there results a smooth outer form of the adapter 35.

The screw cap has a hollow cylinder 63, that is provided with an inner thread and its inner ring surface 64 fits on the convex surface 36 of the insulator track 2 introduced into the slit 56. In this way this is held in the slit by press-fitting.

Although the present invention has been described with reference to preferred embodiments, workers skilled in the art will recognize that changes may be made in form and detail without departing from the spirit and scope of the invention.

We claim:

1. A low-voltage power cable comprising:
   an insulator which forms a rail with a profile which is multiply flanged and slender in a main axis thereof; and
   wire-cloth bands serving as current phases, the wire-cloth bands being positioned on both sides of the insulator and attached to broad sides of a rectangular cross section of the insulator, and wherein the wire-cloth bands are arranged in profile chambers which are formed by the rectangular cross section and the profile flanges.

2. The low-voltage power cable according to claim 1, wherein the profile of the insulator is symmetrical.

3. The low-voltage power cable according to claim 1, wherein the multiple profile flanges are arranged to form a double-T insulator profile outline.

4. The low-voltage power cable according to claim 1, wherein a ratio of the greatest profile width to the profile height is approximately 5:30.

5. The low-voltage power cable according to claim 3, wherein the thickness of the rectangular flanges of the double-T profiles is related to the thickness of profile bridges at the rectangular cross section as approximately 3:2, and the ratio of the thickness of the flanges fused in a constructed unity into one strap to the thickness of the profile bridges amounts to approximately 4:2.

6. The low-voltage power cable according to claim 3, wherein the double-T insulator profile outline form two profile chambers, each profile chamber having one of said wire-cloth bands arranged therein.

7. The low-voltage power cable according to claim 1, wherein the wire-cloth bands arranged on one side of the insulator are connected to one or several systems and the wire-cloth bands arranged on the opposite side are connected to one or several additional systems.

8. The low-voltage power cable according to claim 1, wherein the wire-cloth bands are sunk in the profile chambers in such a manner that outer sides thereof are essentially flush with the outer edges of walls of the profile chambers.

9. The low-voltage power cable according to claim 1, wherein the multiple profile flanges are arranged to form a double-T profile having a middle bridge which electrically isolates the wire-cloth bands of two systems and a middle flange which electrically isolates the wire-cloth bands of said two systems.

10. The low-voltage power cable according to claim 1, wherein the rail forming the profiled insulator has a full cross-section of extruded material.

11. The low-voltage power cable according to claim 1, wherein the insulator consists of thermoplastic synthetic material.

12. The low-voltage power cable according to claim 11, wherein the synthetic material of the insulator is transparent.

13. The low-voltage power cable according to claim 1, further comprising at least one adapter which is designed as a housing enclosing the insulator rail, in which housing has a clamp for releasable attachment to the insulator rail and a connection for electrical and mechanical linkage of the housing to an insulated holder.

14. The low-voltage power cable according to claim 13, wherein the housing has socketed contact springs for the electrical connection to the wire-cloth bands.

15. The low-voltage power cable according to claim 13, wherein the housing for the reception of the insulator rail has an axial slit, which has an inner end, on which the insulator rail is supported, and whose open end is closable with the clamp.

16. The low-voltage power cable according to claim 13, wherein the housing is in the form of a hollow cylinder, and the clamp and the connection are rotationally symmetrical around a cylinder axis of the housing.

17. The low-voltage power cable according to claim 13, wherein an outside cylinder surface of the housing is flush with an outside cylinder surface of a screw cap forming the clamp and outside cylinder surface of the connection.

18. The low-voltage power cable according to claim 14, wherein the connection and the socket for the contact springs form a constructed unity, which takes up a receptacle bushing with a sleeve for a coaxial cable.

19. The low-voltage power cable according to claim 14, wherein the base of the contact springs forms with a receptacle bushing a constructed unity, which is attached to a screw cap of the housing, which screw cap has an inner ring surface, with which a face side of sleeve screwed onto the receptacle bushing tightens itself.

20. The low-voltage power cable according to claim 14, wherein the contact springs are arranged parallel to the housing axis, and their contacts are arranged one above the other.

21. The low-voltage power cable according to claim 13, wherein the housing and the rail of the insulator consist of the same synthetic material.

22. The low-voltage power cable according to claim 1, further comprising at least one adapter which is designed as a housing enclosing the insulator rail, in which housing has a clamp for releasable attachment to the insulator rail and a connection for electrical and mechanical linkage of the housing to a current-forwarding holder.

* * * * *